US007467782B2

(12) United States Patent  (10) Patent No.: US 7,467,782 B2
Harvey et al.  (45) Date of Patent: *Dec. 23, 2008

(54) FIBER REDIRECT SYSTEM, MULTI-AXIS ROBOTIC WRIST AND FIBER PLACEMENT APPARATUS INCORPORATING SAME AND RELATED METHODS

(75) Inventors: James L. Harvey, Salt Lake City, UT (US); Douglas G. Harris, West Valley City, UT (US); James M. Brown, Salt Lake City, UT (US); Boyd Hatch, West Valley City, UT (US)

(73) Assignee: Alliant Techsystems Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/348,537

(22) Filed: Feb. 6, 2006

(65) Prior Publication Data

US 2006/0231671 A1  Oct. 19, 2006

Related U.S. Application Data

(63) Continuation of application No. 10/428,332, filed on May 2, 2003, now Pat. No. 6,994,324.

(51) Int. Cl.
*B66D 1/00* (2006.01)
(52) U.S. Cl. ..................................... 254/388
(58) Field of Classification Search ................. 254/388, 254/392–395; 156/361, 574, 433, 441
See application file for complete search history.

(56) References Cited

U.S. PATENT DOCUMENTS 4,750,960 A * 6/1988 Bubeck ...................... 156/169

(Continued)

FOREIGN PATENT DOCUMENTS

| EP | 0 535 264 A1 | 4/1993 |
| EP | 0 768 158 A1 | 4/1997 |
| GB | 2 147 561 A | 5/1985 |

OTHER PUBLICATIONS

PCT International Search Report for Application PCT/US2004/013461, dated Nov. 17, 2004.

(Continued)

*Primary Examiner*—M Marcelo Emmanuel
(74) *Attorney, Agent, or Firm*—IPLM Group, P.A.

(57) ABSTRACT

A fiber redirect system for use with a multi-axis robotic wrist and fiber placement system and methods of using the same are provided. The fiber redirect system may include one or more redirect mechanisms configured to alter the path of one or more fiber tows fed from a creel assembly to a fiber placement head. The redirect mechanism may be located and configured so as to be centered about either the intersection of the pitch and yaw axes of the robotic wrist or the intersection of the yaw and roll axes of the robotic wrist. In one exemplary embodiment, a first redirect mechanism is centered about the intersection of the pitch and yaw axes, a second redirect mechanism is centered about the intersection of the yaw and roll axes and a third redirect mechanism may be centered about the roll axis.

20 Claims, 10 Drawing Sheets

U.S. PATENT DOCUMENTS

| | | | | |
|---|---|---|---|---|
| 4,872,619 | A * | 10/1989 | Vaniglia | 242/437.3 |
| 4,877,193 | A * | 10/1989 | Vaniglia | 156/574 |
| 4,943,338 | A * | 7/1990 | Wisbey | 156/433 |
| 5,110,395 | A * | 5/1992 | Vaniglia | 156/353 |
| 5,239,457 | A * | 8/1993 | Steidle et al. | 700/57 |
| 5,273,614 | A * | 12/1993 | Grimshaw et al. | 156/433 |
| 5,290,389 | A * | 3/1994 | Shupe et al. | 156/425 |
| 5,472,553 | A * | 12/1995 | Roberts | 156/353 |
| 5,645,677 | A * | 7/1997 | Cahuzac et al. | 156/361 |
| 5,698,033 | A * | 12/1997 | Rieger et al. | 118/411 |
| 5,698,066 | A | 12/1997 | Johnson et al. | |
| 5,733,357 | A * | 3/1998 | Stephens et al. | 75/444 |
| 5,766,357 | A * | 6/1998 | Packer et al. | 118/420 |
| 5,979,531 | A | 11/1999 | Barr et al. | |
| 6,026,883 | A * | 2/2000 | Hegerhorst et al. | 156/441 |
| 6,112,792 | A * | 9/2000 | Barr et al. | 156/441 |
| 6,254,027 | B1 * | 7/2001 | Kunou | 242/432.4 |
| 6,491,773 | B1 * | 12/2002 | Miller et al. | 156/64 |
| 6,869,004 | B2 * | 3/2005 | Priest et al. | 226/195 |
| 6,968,883 | B2 | 11/2005 | Torres Martinez | |
| 7,004,219 | B2 | 2/2006 | Nelson | |

OTHER PUBLICATIONS

Telefax from Dassault Aviation (M. Phillipe CARIOT) to Alliant Aerospace Compnay (Mr. D Taylor) dated Oct. 2, 2001 (2 pages) with attached "rider No. 4" (6 pages)—(8 pages total).

E-mail from Devor Taylor dated Apr. 15, 2002 regarding "FPM-3 issues" with attachment (2 pages total).

Shipping Authorization for Ovoid I dated Jul. 22, 2002 (1 page).

Shipping Authorization for Ovoid II with Shipper's Export Declaration dated Sep. 13, 2002 (2 pages).

Additional Facts Relating to Relationship between Alliant Aerospace and Dassault Aviation (regarding activities between approximately Oct. 2001 and Sep. 2002) (2 pages).

Proprietary Information Disclosure Agreement between ATK Aerospace Company Inc. and The Ingersoll Milling Machine Company, effective Feb. 23, 2002.

Email from James Harvey to Douglas Harris, dated Feb. 27, 2002, regarding Ingersoll visit to Alliant, with attached AFPM Features and Performance List and group photograph.

Email from Douglas Harris to Dan Jarvi, dated Mar. 4, 2002, regarding Ingersoll visit to Alliant.

Email from Douglas Harris to Dan Jarvi, dated Mar. 5, 2002, regarding Ingersoll visit to Alliant.

Email from Douglas Harris to Lloyd Miller et al., dated Mar. 13, 2002, regarding Ingersoll Visit, with attached Agenda for Ingersoll Visit to UCC, Mar. 14-15, 2002.

PowerPoint presentation, "Recent ATK FPM Developments," Mar. 13, 2002, 21 pages.

PowerPoint presentation, "The Ingersoll/ATK FPM Partnership," Mar. 14, 2002, 17 pages.

Email from Dan Jarvi to Douglas Harris, dated Mar. 19, 2002, regarding Ingersoll AFPM and installation specs, with attached General Specification for SO 66678, Sub-Shop Order List, Ingersoll Supplied, Lockheed Martin Supplied, Parameters for Full Contract Installation, and General Specification for SO 40130 & 40131.

Email from Douglas Harris to James Harvey, dated Apr. 1, 2002, regarding Ingersoll FPM.

Email from Douglas Harris to Dan Jarvi, dated Apr. 5, 2002, regarding Specification, with attached Fiber Placement Machine Specification.

Email from Dan Jarvi to Doug Harris, dated Apr. 12, 2002, regarding Prices, with attached Prices, Delivery, Terms and Conditions.

Email from Dan Jarvi to Doug Harris, dated Apr. 12, 2002, regarding Alliant Schedule, with attached Alliant Techsystems Automated Fiber Placemant Machine Preliminary Schedule.

Email from Dan Jarvi to Doug Harris, dated Apr. 12, 2002, regarding Alliant Upgrade.

Email from Douglas Harris to Dan Jarvi, dated Apr. 15, 2002, regarding Alliant Upgrade.

Email from Douglas Harris to Dan Jarvi, dated Apr. 15, 2002, regarding Alliant Upgrade, with attached drawings.

Email from Dan Jarvi Harris, dated Apr. 16, 2002, regarding Revised AFPM scope of supply, with attached Prices, Delivery, Terms and Conditions.

Email from Douglas Harris to Dan Jarvi, dated Apr. 17, 2002, regarding Revised AFPM scope of supply, with attached Large Fiber Placement Machine Compliance Matrix.

Email from Douglas Harris to Edward Hikida, dated Apr. 18, 2002, regarding Ingersoll Quotations.

Email from Douglas Harris to Edward Hikida, dated Apr. 18, 2002, regarding Revised AFPM scope of supply.

Email from Dan Jarvi to Douglas Harris, dated Apr. 23, 2002, regarding Ingersoll-03 revision prices and Project Overview, with attached Prices, Delivery, Terms and Conditions and ATK Fiber Placement FPM2 Machine Situation dated Apr. 19, 2002.

Email from Douglas Harris to Dan Jarvi, dated May 1, 2002, regarding CPS.

Email from Dan Jarvi to Douglas Harris, dated May 8, 2002, regarding FPM Quatations, with attached Large Fiber Placement Machine Compliance Matrix; Prices, Delivery, Terms and Conditions, and Terms and Conditions for the Ingersoll Milling Machine Company and Alliant Proposal H-22493-01 to 04.

* cited by examiner

FIBER REDIRECT SYSTEM, MULTI-AXIS ROBOTIC WRIST AND FIBER PLACEMENT APPARATUS INCORPORATING SAME AND RELATED METHODS

CROSS-REFERENCE TO RELATED APPLICATION

This application is a continuation of application Ser. No. 10/428,332, filed May 2, 2003, now U.S. Pat. No. 6,994,324, issued Feb. 7, 2006.

BACKGROUND OF THE INVENTION

1. Field of the Invention

The present invention relates generally to methods of fiber placement and fiber placement machines and, more specifically, to fiber redirect systems and associated multi-axis robotic wrists utilized with such fiber placement methods and machines.

2. State of the Art

Fiber placement is generally a technique of placing a band of fibers, such as a plurality of preimpregnated fiber tows, onto the surface of a mandrel or on an overlying work piece to form a composite structure. Fiber placement offers various advantages in forming a composite structure including the ability of placing a band of fibers at various angles, widths and lengths onto variously shaped contours and surfaces. Thus, fiber placement enables the fabrication of composite structures which exhibit complex shapes and surfaces while simultaneously enabling the band of fibers to be located and oriented in a structurally desired orientation and configuration.

Fiber placement systems generally include a supply of fiber tows, referred to herein as a creel or creel assembly. Individual tows of fiber are supplied from the creel assembly and fed to a robotic wrist which includes a placement or delivery head. The robotic wrist conventionally allows positioning of the placement head by articulating the wrist about multiple axes. For example, a multi-axis robotic wrist may allow movement about three orthogonal axes conventionally referred to as yaw, pitch and roll axes.

In feeding the fiber tows from a creel assembly to the placement, it is desirable to maintain at least a minimum level of tension within the fiber tows such that they remain relatively taut. Without such tension, the fiber tows may become twisted, displaced and/or damaged. At best, such results cause a delay in the fiber placement process and require additional maintenance of the fiber placement system by an operator thereof. However, a damaged or otherwise improperly placed fiber tow or segment thereof may ultimately result in a defective composite structure.

The fiber path of the individual tows between the creel assembly and the placement head usually includes the passing of the fiber tows around one or more redirect rollers. The redirect rollers enable the fiber tows to change directions and, also, to accommodate the changing positions and orientations of the robotic wrist as it positions the placement head for application of the fiber tows to a desired surface. In some prior art systems, redirect rollers are coupled to servo motors or other positioning devices to enable independent positioning of the redirect rollers in an attempt to define and redefine the path of the fiber tows depending on, for example, the position and orientation of the robotic wrist and its associated placement head.

However, the use of such redirect rollers has not been entirely successful in maintaining the fiber tows in a relatively taut condition. For example, as a robotic wrist positions itself at the limits of travel about its yaw, pitch and roll axes, the path of the fiber tows is conventionally lengthened, causing an additional length of material to be fed from the creel assembly for the individual tows. However, as the robotic wrist becomes relatively more retracted in its yaw, pitch and roll positions, the fiber path is conventionally shortened or contracted, causing the individual fiber tows to exhibit an amount of slack between the creel assembly and the placement head. Such slack may ultimately result in a fiber tow becoming unacceptably twisted, damaged or displaced from its individual path about the various redirect rollers.

While mechanisms, such as the above-mentioned servo motor positioning system, have been utilized in an attempt to better control the changing path of the fiber tows, such systems have been limited in their success and, further, introduce additional complexities and costs into fiber placement systems. For example, such mechanisms may require complicated computer control to correlate the movements of such a mechanism with the movements of the robotic wrist and placement head. Additionally, such mechanisms introduce additional issues of maintenance for the operator of the fiber placement equipment.

A somewhat related issue with regard to multi-axis robotic wrists includes the harnessing of numerous electrical cables or other transmission lines (e.g., hydraulic or pneumatic tubing) coupled with the various controls, sensors, motors and other actuators associated with the wrist and placement head. Again, as a multi-axis robotic wrist articulates through its various ranges of motion, such transmission lines exhibit a certain amount of slack so as to avoid overextension and tensile failure thereof. Thus, with the transmission lines exhibiting slack from time to time, depending on the position of the robotic wrist, such transmission lines may undesirably catch on a protruding object or otherwise become tangled in some manner.

In view of the shortcomings in the art, it would be advantageous to provide a fiber placement system, including a fiber redirect system and robotic wrist, which minimizes the change in length of the fiber path between, for example, a creel assembly and a placement head while accommodating the various positions, orientations and configurations the robotic wrist and placement head may assume.

Additionally, it would be advantageous to provide a fiber placement system having a fiber redirect system which does not require additional positioning mechanisms such as, for example, servo motors, with attendant computer control of the same. Rather, it would be advantageous to have such a redirect system continuously control the fiber path automatically, based on the position and orientation of the robotic wrist and placement head, without independent control of the redirect mechanisms.

BRIEF SUMMARY OF THE INVENTION

In accordance with one aspect of the invention, a fiber redirect system is provided for use in association with a multi-axis robotic wrist and a fiber placement system. The fiber redirect system includes at least one redirect mechanism configured to alter a path of at least one fiber tow engaged therewith. The at least one redirect mechanism is centered about either an intersection of a pitch axis and a yaw axis of the multi-axis robotic wrist or an intersection of a roll axis and the yaw axis of the multi-axis robotic wrist.

In one exemplary embodiment, the at least one redirect mechanism may include a first redirect mechanism which is centered about the intersection of the pitch and yaw axes, a second redirect mechanism centered about the intersection of the yaw and roll axes and a third redirect mechanism centered about the roll axis.

In accordance with another aspect of the present invention, a robotic wrist for a fiber placement system is provided. The robotic wrist includes a first section, a second section coupled with the first section and a third section coupled with the second section. The first, second and third sections are configured to articulate about a pitch axis of the robotic wrist. The second and third sections are configured to articulate about a yaw axis of the robotic wrist. The third section is configured to articulate about a roll axis of the robotic wrist. At least one redirect mechanism is centered about either an intersection of the pitch axis and the yaw axis or an intersection of the yaw axis and the roll axis and is configured to alter the path of at least one fiber tow engaged therewith.

In accordance with yet another aspect of the present invention, a fiber placement system is provided. The fiber placement system includes a creel assembly including a supply of at least one fiber tow. A fiber placement system also includes a robotic wrist such as described above including at least one redirect mechanism centered about either the intersection of a pitch axis and a yaw axis or the intersection of the yaw axis and a roll axis. Additionally, the fiber placement system may include a structural platform on which the robotic wrist is movably positioned.

In accordance with a further aspect of the present invention, a method is provided for conveying at least one fiber tow from a creel assembly to a placement head of a fiber placement system. The method includes coupling a robotic wrist with the placement head and configuring the robotic wrist to be movable about a pitch axis, a yaw axis and roll axis. A first redirect mechanism is configured to be centered about an intersection of the pitch axis and yaw axis and a second redirect mechanism is configured to be centered about an intersection of the yaw axis and the roll axis. The at least one fiber tow is passed from the creel assembly to the first redirect mechanism, from the first redirect mechanism to the second redirect mechanism and from the second redirect mechanism to the placement head.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
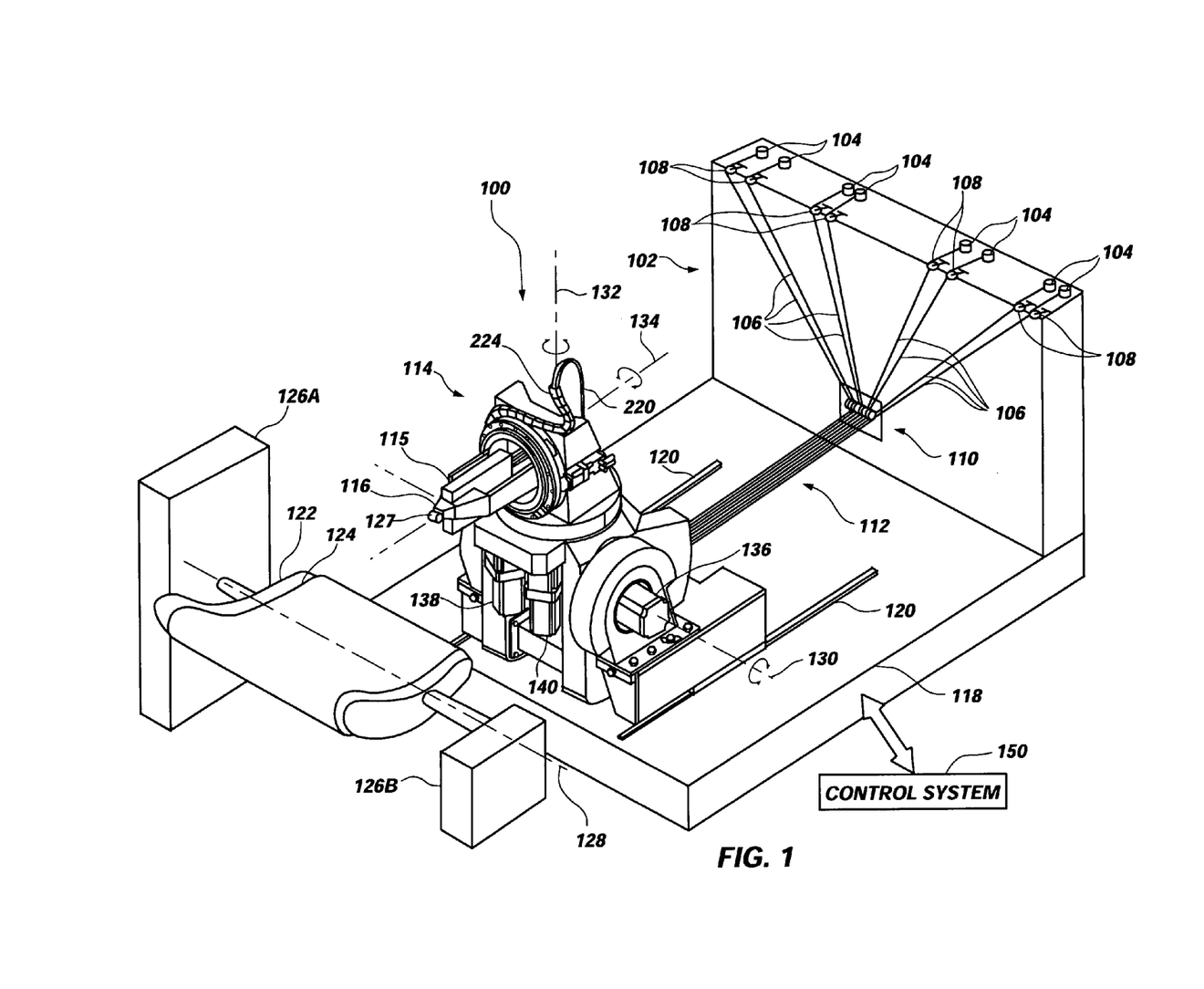
FIG. 1 is a perspective view of a fiber placement system in accordance with an embodiment of the present invention.

Referring to FIG. 1, a fiber placement system 100 is shown in accordance with an embodiment of the present invention. The fiber placement system 100 includes a creel assembly 102 having, for example, multiple sources 104 of individual fiber tows 106 such as, for example, tows of preimpregnated carbon fiber or other prepreg materials. A tensioning system may also be associated with the creel assembly 102 including a plurality of individual tensioners 108, each associated with an individual fiber tow 106. An exemplary tensioning system is disclosed in U.S. Pat. No. 6,491,773 B1 assigned to the assignee of the present invention and entitled POSITION CONTROLLED TENSIONER SYSTEM, issued Dec. 10, 2002, the disclosure of which is incorporated herein by reference in its entirety.

The individual fiber tows 106 are gathered to a central location 110 and generally collimated into one or more bands of substantially parallel and laterally spaced fiber tows 106, referred to herein as tow bands 112. It is noted that FIG. 1 shows a single tow band 112 being formed of the individual fiber tows 106. Additionally, it is noted that FIG. 1 shows eight individual fiber tows 106 being fed from the creel assembly 102. However, such are merely exemplary for purposes of illustration and, as will be discussed in greater detail below, the use of multiple tow bands 112, as well as tow bands 112 formed of other numbers of individual fiber tows 106, are clearly within the scope of the present invention.

The tow band 112 extends from the central location 110 to a robotic wrist 114, through the robotic wrist 114 through a delivery system 115 to a fiber placement head 116. The delivery system 115 may include mechanisms for cut/clamp and restart of individual fiber tows 106. As known to those of ordinary skill in the art, the use of cut/clamp and restart mechanisms enable individual payout control of the fiber tows 106 providing for varied width tow bands 112 to be fed through the placement head 116.

The robotic wrist 114 is located on a structural platform 118 which may also be referred to as a gantry. The robotic wrist 114 may be variably positionable relative to the structural platform 118, such as along a set of tracks 120. The structural platform 118, or portions thereof, may also be variably positionable along one or more axes so as to afford considerable flexibility in positioning the robotic wrist 114 and its associated placement head 116, as will be appreciated by those of skill in the art. Additionally, as will be discussed in greater detail below, the robotic wrist 114 is configured for positioning, relative to the structural platform 118, about multiple axes.

It is noted that, while the fiber placement system 100, shown and described with respect to FIG. 1, includes a gantry or structural platform 118, other configurations, such as the use of a boom coupled with the robotic wrist 114, may also be adapted for use with the present invention as will be appreciated by those of skill in the art.

The tow band 112 (or bands, as the case may be) may be somewhat consolidated, or more tightly collimated, as they are fed into the placement head 116 such that each fiber tow 106 is substantially laterally contiguous with each adjacent fiber tow 106. The placement head 116 may then selectively apply a segment of the consolidated tow band 112 to a location over the surface of a mandrel 122, or over a surface of a work piece 124 being formed on the mandrel 122 such placement being either directly on the mandrel 122 or work piece 124 or over a previously applied fiber layer or other component. The mandrel 122 and associated work piece 124 may be held and positioned by a head stock 126A and a tail stock 126B. The head stock 126A and tail stock 126B may be configured and located to rotate the mandrel 122 and work piece 124 about a specified axis 128, and may further be configured to displace the mandrel 122 and work piece 124 along additional axes of movement, if so desired.

In applying the fiber tows 106 to the mandrel 122 or work piece 124, such as in the form of a consolidated fiber tow band, the placement head 116 may heat the tow band 112 to effect a partial cross-linking of the individual fiber tows 106 with each other as well as with the surface of the work piece 124. Additionally, a consolidating member 127, such as a roller, a shoe or a shaped platen may be used to press the tow band 112 onto the surface of the mandrel 122 or work piece 124 or previously applied fibers or other components to remove voids therebetween. The placement head 116 may apply the fiber tows 106 such that they exhibit a desired fiber orientation, width and/or length. Thus, work pieces 124, exhibiting complex shapes and surface geometries, may be constructed by placing and orienting the fibers in a desired configuration for purposes of strength and structural integrity.

In placing the fiber tows 106 to the mandrel 122 or work piece 124, it may generally be desirable to orient the placement head 116 substantially normal to the surface to which the fiber tows 106 are being placed. Thus, in order to effectively position the placement head 116 for application of the fiber tows 106 on the surface of the mandrel 122 or work piece 124, the robotic wrist 114 is configured to articulate about multiple axes. For example, the robotic wrist 114 may be configured to rotate about a first axis 130, referred to herein as the pitch axis. Further, the wrist 114 may be configured to rotate about a second axis 132, referred to herein as the yaw axis. Additionally, the robotic wrist 114 and, more specifically an upper section of the robotic wrist 114 including the delivery system 115 and placement head 116, may be configured to rotate about a third axis 134, referred to herein as the roll axis.

The various axes of rotation may be oriented in a specified geometric relationship relative to one another. For example, the pitch axis 130 may intersect the yaw axis 132 at a substantially perpendicular angle. Similarly, the roll axis 134 may intersect the yaw axis 132 at a substantially perpendicular angle. Further, the roll axis 134 may be displaced a defined distance along the yaw axis 132 from the intersection of the yaw and roll axes 132 and 134 while also being oriented at a substantially perpendicular angle relative to the pitch axis 130.

The robotic wrist 114 may be rotated about the various axes 130, 132 and 134 by actuators 136, 138 and 140 which may include, for example, electric motors and associated gearing, although other mechanisms may be used as will be appreciated by those of skill in the art. In one exemplary embodiment, the robotic wrist 114 may be able to rotate approximately 60° up (or back) and 50° down (or forward) about the pitch axis 130, approximately ±95° about the yaw axis 132 and approximately ±150° about the roll axis 134 relative to a substantially neutral position such as that shown in FIG. 1.

The fiber placement system 100 may be operatively coupled with a control system 150, shown schematically in FIG. 1, which may be used to control the various systems and components such as, for example, the creel assembly 102 and its associated tensioning system, the robotic wrist 114 and its various components, the head stock 126A and/or tail stock 126B and even the positioning of the structural platform 118 relative to the mandrel 122 and work piece 124. Such control may be effected by, for example, a computer through computer numeric control (CNC) techniques or other similar control systems, as will be appreciated by those of ordinary skill in the art.

Figure 2A:
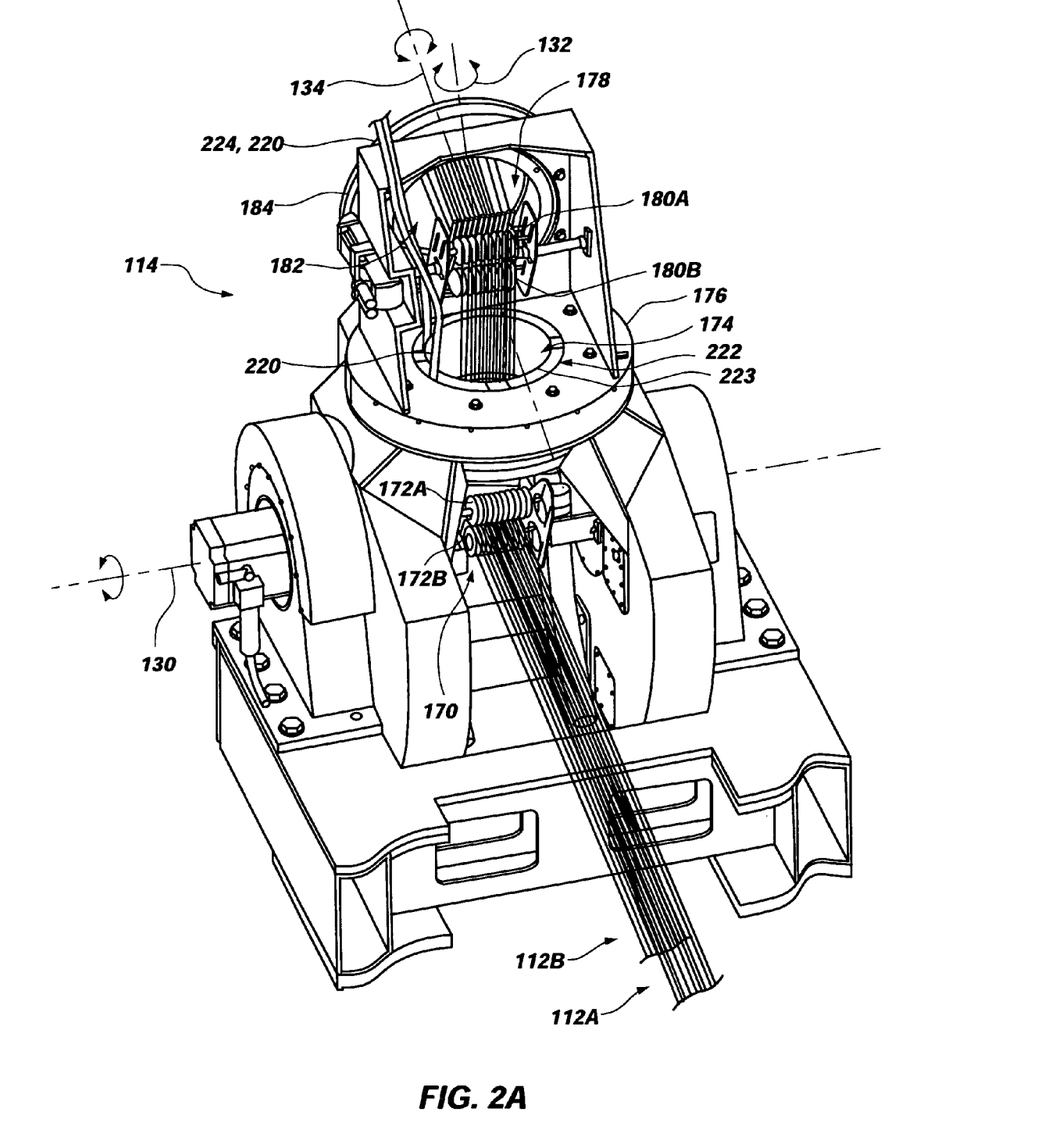
FIG. 2A is a rear perspective view of a robotic wrist according to an embodiment of the present invention.
Figure 2B:
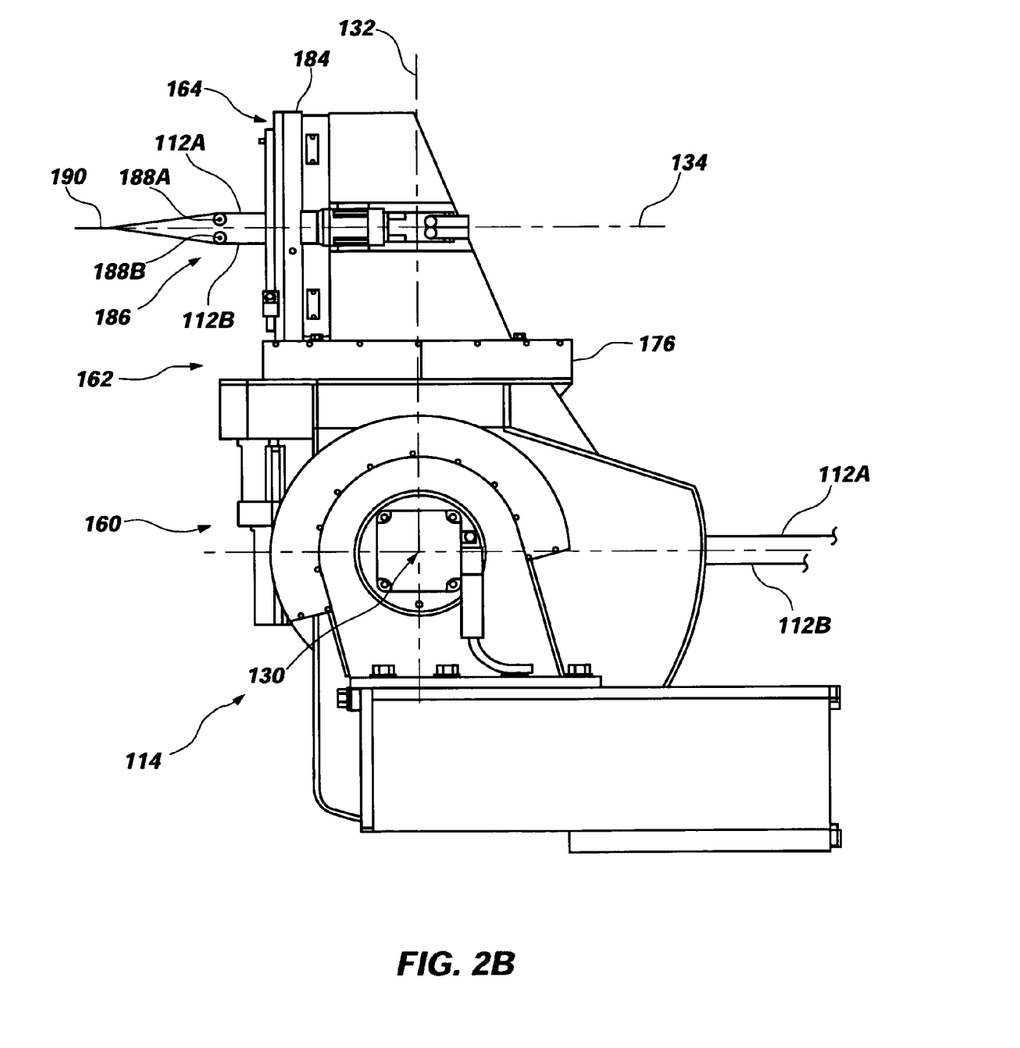
FIG. 2B is a side elevational view of the robotic wrist shown in FIG. 2A.
Figure 2C:
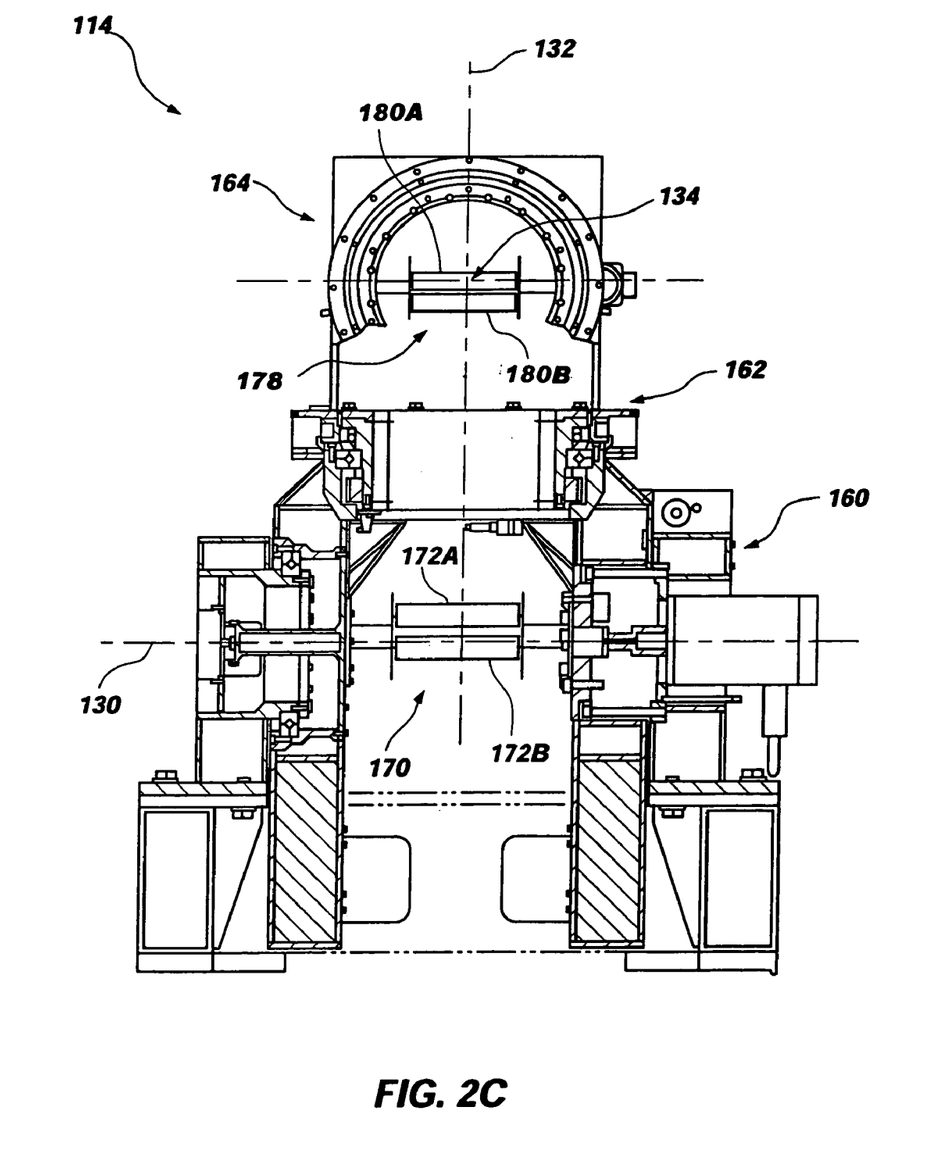
FIG. 2C is a front partial cross-sectional view of the robotic wrist shown in FIG. 2A.
Figure 2D:
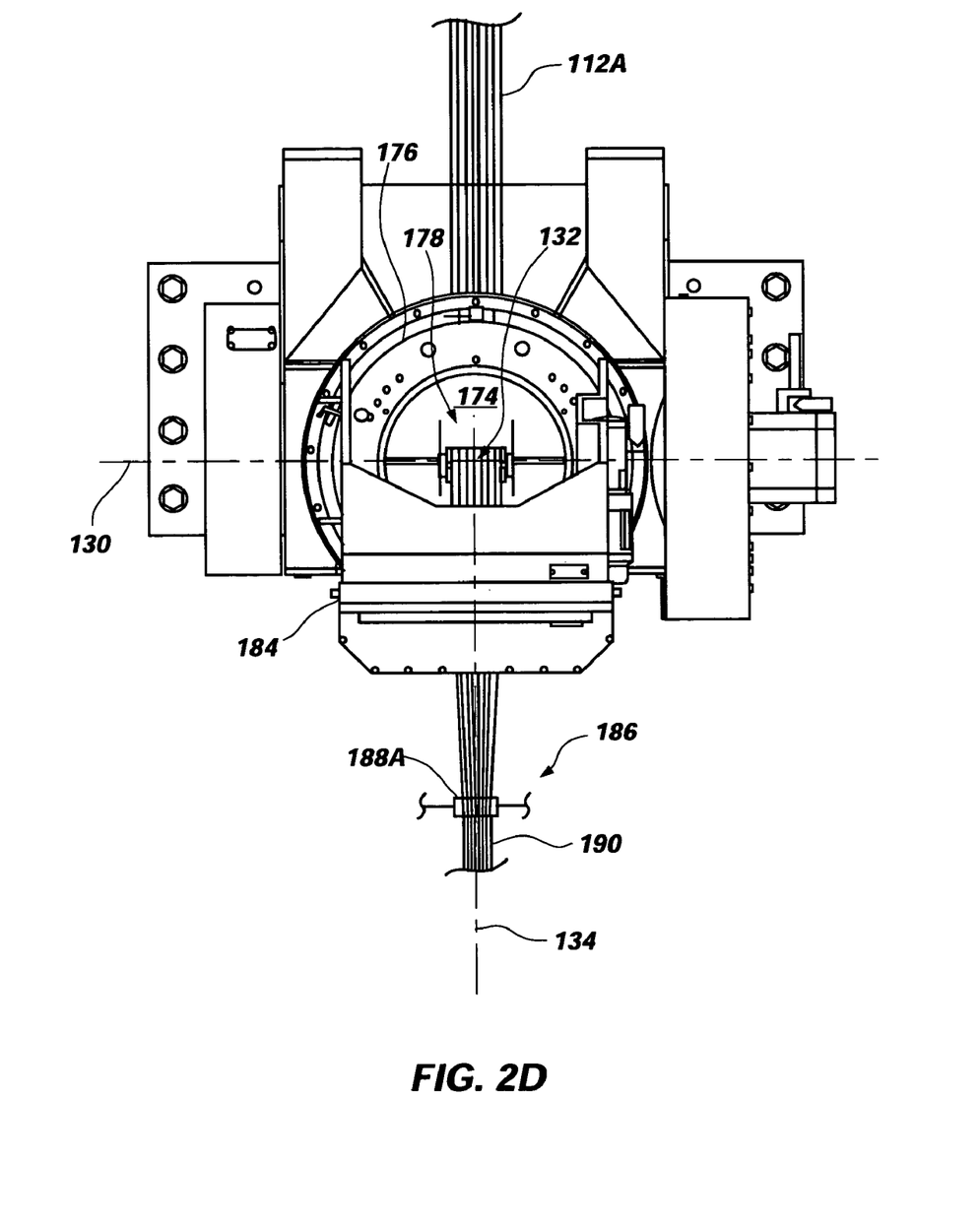
FIG. 2D is a plan view of the robotic wrist shown in FIG. 2A.

Referring now to FIGS. 2A-2D, various views of the robotic wrist 114 of the present invention are shown without the delivery system 115 or placement head 116 (FIG. 1) for purposes of convenience and clarity in illustration. It is noted that FIG. 2A is a rear perspective view of the robotic wrist 114, FIG. 2B is a side elevational view of the robotic wrist 114, FIG. 2C is a front elevational view in partial cross section of the robotic wrist 114 and FIG. 2D is a plan view of the robotic wrist 114.

As previously noted, the robotic wrist 114 is configured to rotate about various axes 130, 132 and 134. More specifically, the robotic wrist may be described as having three general sections including a lower section 160, a mid-section 162 and an upper section 164 wherein at least one of the three general sections 160, 162 and 164 rotate about each of the defined axes of rotation 130, 132 and 134. Thus, for example, all three sections 160, 162 and 164 may be configured for rotation about the pitch axis 130; the mid-section 162 and upper section 164 may be configured to rotate about the yaw axis 132; and the upper section 164 may be configured to rotate about the roll axis 134.

It is further noted that the axes 130, 132 and 134 may move relative to other components of the fiber placement system 100 (FIG. 1) while maintaining their geometric configuration relative to one another. Thus, for example, when the lower, mid- and upper sections are rotated about the pitch axis 130, the yaw and roll axes 132 and 134 are also rotated about the pitch axis 130 and thus relative to, for example, the structural platform 118 (see FIG. 1) but maintain their geometric relationship with the pitch axis 130.

FIGS. 2A-2D show an embodiment wherein multiple tow bands, shown as an upper tow band 112A and a lower tow band 112B, are fed through the robotic wrist 114 to the delivery system 115 and placement head 116 (FIG. 1). The tow bands 112A and 112B, which each include a plurality of fiber tows 106 as discussed above herein, travel from a location behind the robotic wrist 114 to a first redirect mechanism 170, referred to herein as the pitch redirect mechanism, and which may include a pair of redirect rollers 172A and 172B. The pitch redirect mechanism 170 enables the tow bands 112A and 112B to change direction of travel as they pass through the robotic wrist 114. Furthermore, while FIGS. 2A-2D show the tow bands 112A and 112B changing direction from a substantially horizontally oriented path prior to engagement with the pitch redirect mechanism 170 to a substantially vertically oriented path subsequent to engagement with the pitch redirect mechanism 170, the pitch redirect mechanism enables the path of the tow bands 112A and 112B to adapt to any of the robotic wrist's changing positions. As will be discussed in greater detail below, the pitch redirect mechanism 170 is centered about the intersection of the pitch and yaw axes 130 and 132.

The tow bands 112A and 112B extend from the pitch redirect mechanism 170 through an opening 174 defined by a yaw bearing 176 to a second redirect mechanism 178, referred to herein as the yaw redirect mechanism. The yaw redirect mechanism 178 may also include a pair of redirect rollers 180A and 180B configured to redirect the path of the tow bands 112A and 112B respectively. Furthermore, while FIGS. 2A-2D show the tow bands 112A and 112B changing from a substantially vertically oriented path prior to engagement with the yaw redirect mechanism 178 to a substantially horizontally oriented path subsequent to engagement with the yaw redirect mechanism rollers 172A and 172B, the yaw redirect mechanism 178 allows the path of the tow bands 112A and 112B to adapt to any of the robotic wrists changing positions. As will be discussed in greater detail below, the yaw redirect mechanism 178 is centered about the intersection of the yaw and roll axes 132 and 134.

The tow bands 112A and 112B travel from the yaw redirect mechanism 178 through an opening 182 defined in roll bearing 184 to another redirect mechanism 186 (FIGS. 2B and 2D) referred to herein as the roll redirect mechanism. The roll redirect mechanism 186 may include a pair of redirect rollers 188A and 188B configured such that the individual fiber tows 106 of each band 112A and 112B are spaced apart from adjacent fiber tows 106 a distance equal to the nominal width of the fiber tows 106. Thus, as the tow bands 112A and 112B extend beyond the roll redirect mechanism 186, the fiber tows 106 of the upper tow band 112A may be redirected to converge with and commingle with the redirected fiber tows 106 of the lower tow band 112B to form a single collimated tow band 190 comprising all of the fiber tows 106 fed from the creel assembly 102 (FIG. 1). As will be discussed in further detail below, the roll redirect mechanism 186 is centered about the roll axis 134.

It is noted that none of the redirect mechanisms 170, 178 and 186 require additional actuators or control mechanisms to position them independent of and relative to the robotic wrist 114. Rather, each redirect mechanism 170, 178 and 186 is configured to include simple mechanical members which stay in a fixed position relative to the portion of the robotic wrist to which each is attached (e.g., the lower section 160, mid-section 162 or upper section 164).

Figure 3A:
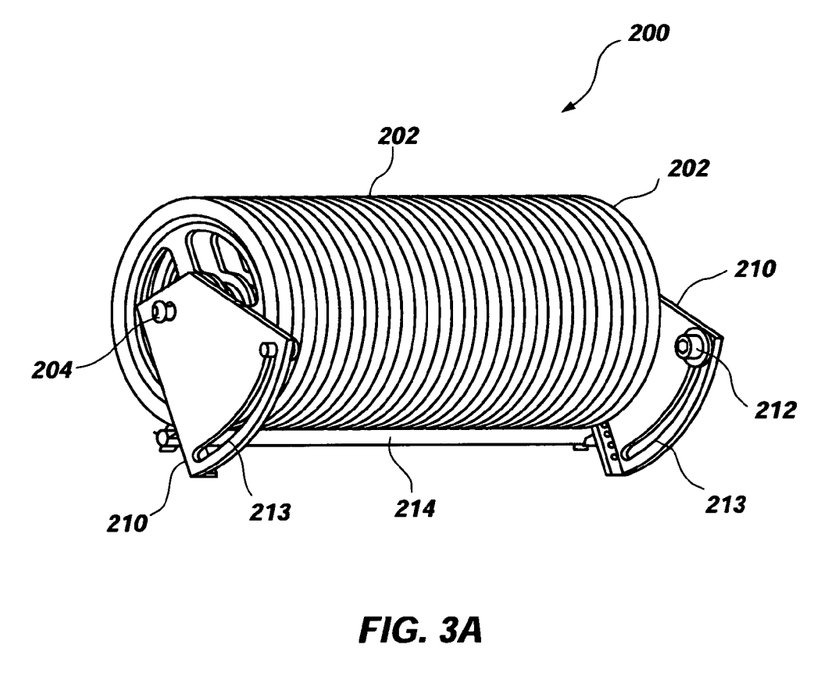
FIGS. 3A and 3B show a roller assembly which may be used with a robotic wrist in accordance with an embodiment of the present invention.
Figure 3B:
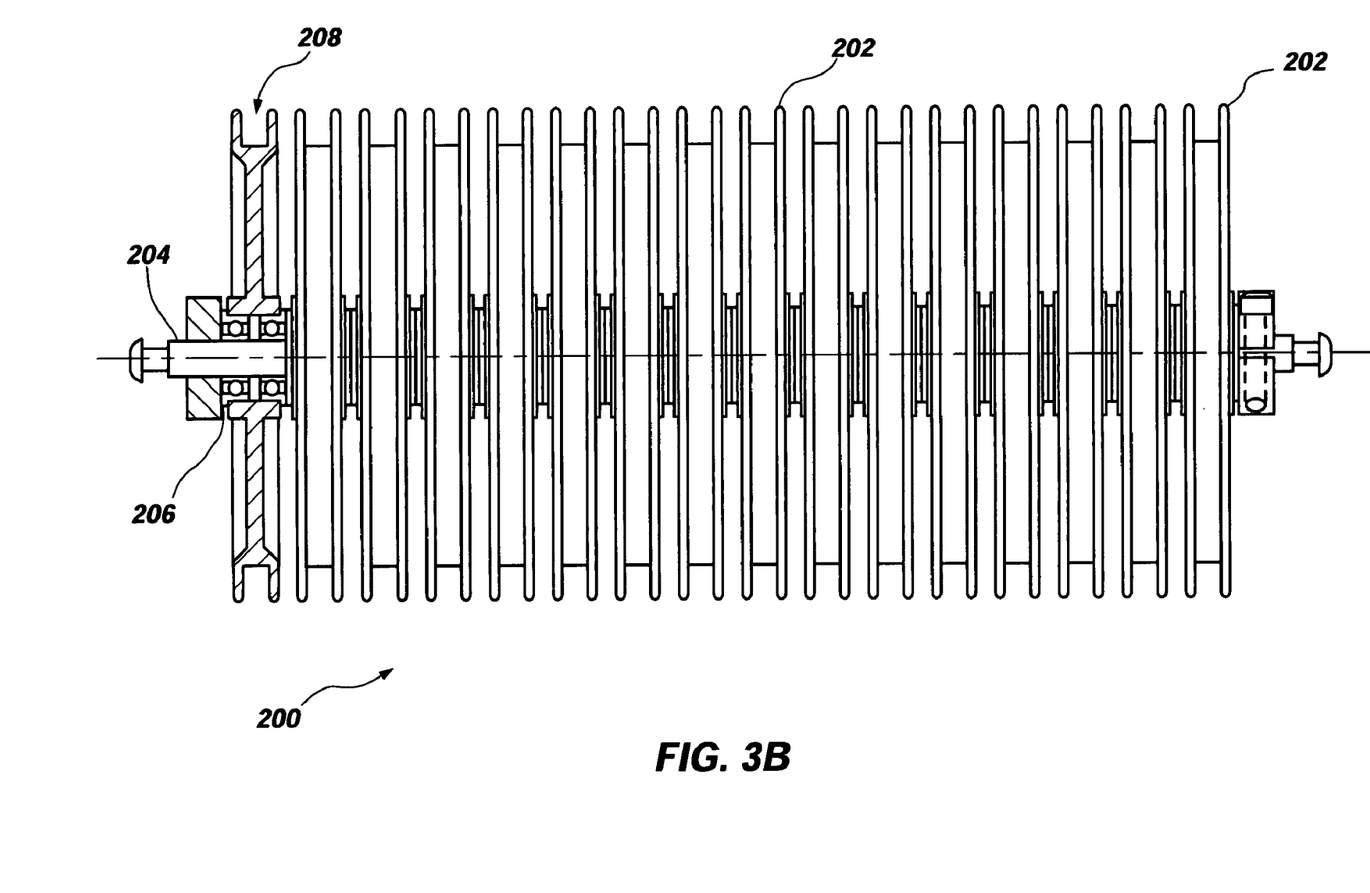

Referring to FIGS. 3A and 3B, an exemplary roller assembly 200 is shown which may be used, for example, as a roller 172A, 172B, 180A, 180B, 188A, 188B or other equivalent roller, in conjunction with one or more of the above described redirect mechanisms 170, 178 and 186 and which shows the simplicity of the redirect mechanisms of the present invention. The roller assembly 200 may include a plurality of individual rollers or pulleys 202 coupled to a shaft 204 by way of bearings 206 such that each pulley 202 may rotate independently of the other pulleys 202. Each pulley 202 includes a groove 208 formed about the outer periphery thereof for receiving a fiber tow therein. It is noted that the roller assembly 200 shown includes sixteen individual pulleys 202. Again, such is simply exemplary and other configurations are contemplated. For example, a roller assembly 200 utilized in connection with the redirect mechanisms 170, 178 and 186 shown and described with respect to FIGS. 2A-2D need only include eight individual pulleys 202 commensurate with the number of tows being directed therethrough.

The roller assembly 200 may further include adjustable mounting plates 210 coupled to the shaft 204. The mounting plates 210 may be coupled to a section of the robotic wrist 114 (FIGS. 2A-2D) such as by fasteners 212. The roller assembly 200 may thus be adjusted by loosening the fasteners and rotating the roller assembly 200 through a defined range of motion provided by the slots 213 formed in the mounting plates 210. Thus, the roller assembly 200 and, more particularly, the plurality of pulleys 202 may be adjusted, relative to a given axis of rotation of the robotic wrist 114 (e.g., the pitch axis 130) and then fixed into the selected position by the fasteners 212. A guide member 214 may be positioned across the face of the roller assembly 200 so as to maintain the fiber tows 106 (FIGS. 2A-2D) within the grooves 208 of the pulleys should the fiber tows 106 exhibit slack at any given time while the robotic wrist 114 (FIGS. 2A-2D) articulates through its range of motions.

It is noted that by configuring the pulleys 202 to exhibit a relatively small diameter, the roller assemblies 200 may have their shafts 204, and thus their own rotational axes, positioned closer to the intersection of the centerline of the robotic wrist's axes of rotation (e.g., the intersection of the pitch and yaw axes 130 and 132). By placing the roller assemblies 200 closer to the intersection of the robotic wrist's axes of rotation, the path of the fiber tows 106 may more closely track the actual axes of rotation 130, 132 and 134. However, depending on the type of fiber tows 106 (FIGS. 2A-2D) being utilized, it may be desirable to maintain a minimum pulley diameter so as to not induce unwanted stress in the fiber tows 106 as they travel and bend thereabout. Thus, in one embodiment, an exemplary pulley 202 may exhibit a diameter of approximately 3.5 inches with a groove 208 formed in its outer periphery of approximately 0.25 inch deep resulting in an effective turning surface diameter for engagement by a fiber tow 106 of approximately 3.0 inches.

Referring back to FIGS. 2A 2D, it is noted that, as the mid- and upper sections 162 and 164 rotate about the yaw axis 132, the sections of the tow bands 112A and 112B extending between the pitch redirect mechanism 170 and the yaw redirect mechanism 178 will twist about the yaw axis 132. This is because the pitch redirect mechanism 170 is fixed to the lower section 160 of the robotic wrist 114 and does not rotate about the yaw axis 132 while the yaw redirect mechanism 178 does rotate about the yaw axis 132 with the mid-section 162. Similarly, as the upper section 164 rotates about the roll axis 134, the sections of the tow bands 112A and 112B extending between the yaw redirect mechanism 178 and the roll redirect mechanism 186 will twist about the roll axis 134. These twisting motions cause differential pay out of the individual fiber tows 106. However, due to the configuration of the redirect mechanisms 170, 178 and 186 and, more particularly, due to the centering of the redirect mechanisms about the rotational axes 130, 132 and 134, the differential pay out of the individual fiber tows 106 is minimized such that minimal slack occurs within the fiber tows 106 as they extend between the creel assembly 102 and the placement head 116 (FIG. 1).

Figure 4A:
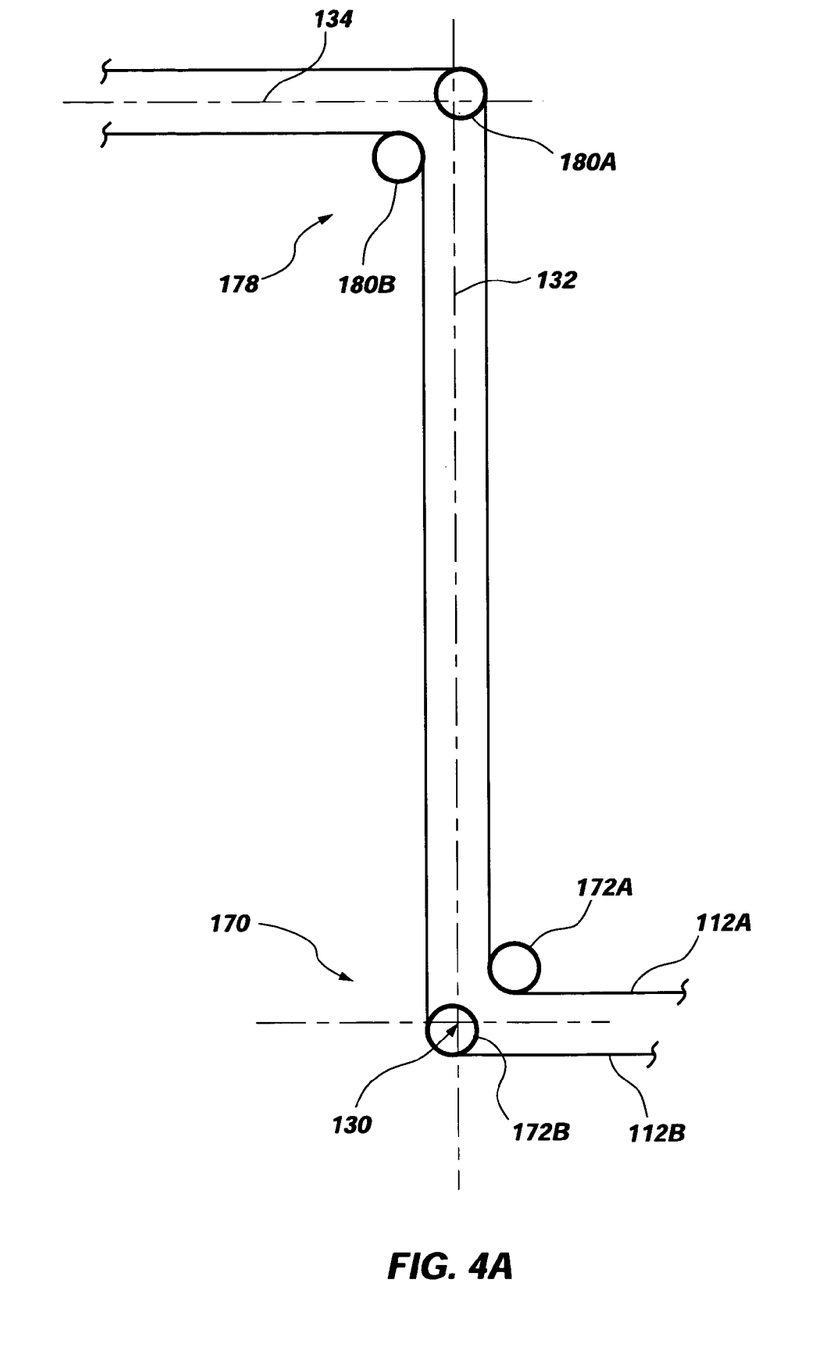
FIG. 4A is a side elevational schematic of a fiber redirect system including an associated fiber path in accordance with an embodiment of the present invention.

For example, FIG. 4A shows a side elevational view of the tow bands 112A and 112B as they travel through their respective paths. As noted above, the pitch redirect mechanism 170 is centered about the intersection of the pitch and yaw axes 130 and 132. This does not mean that the axes of rotation of the redirect rollers 172A and 172B are equal distances from the intersection of the pitch and yaw axes 130 and 132. To the contrary, the redirect rollers 172A and 172B are strategically positioned so the fiber paths of the tow bands 112A and 112B are equally positioned about the intersection of the pitch and yaw axes 130 and 132.

Similarly, the yaw redirect mechanism 178 is centered about the intersection of the yaw and roll axes 132 and 134 such that the fiber paths of the tow bands 112A and 112B are substantially equal distances from the intersection of the yaw and roll axes 132 and 134. Furthermore, the roll redirect mechanism 186 (see FIGS. 2B and 2D) is centered about the roll axis 134 such that the fiber paths of the tow bands 112A and 112B are centered about the roll axis.

Figure 4B:
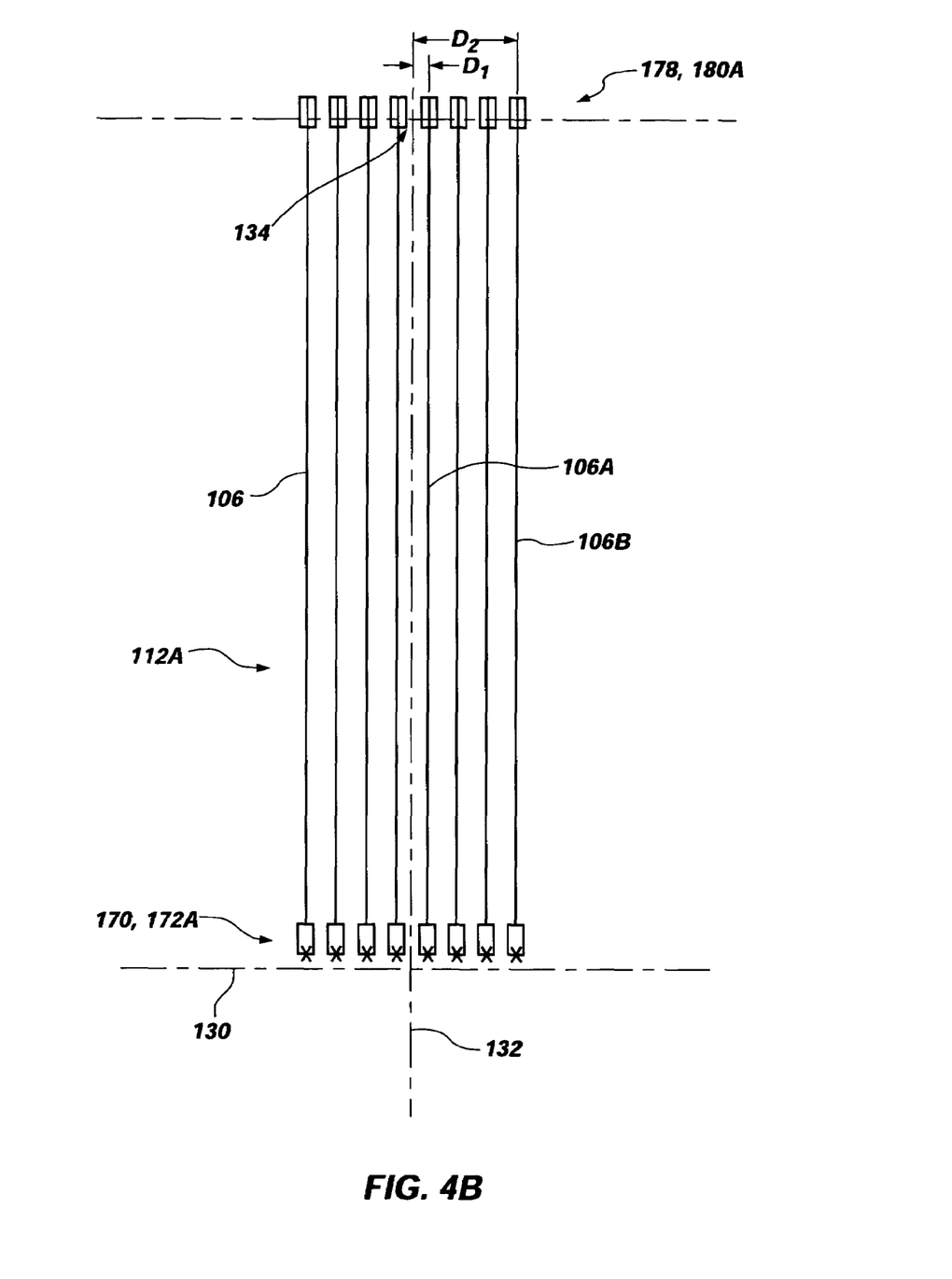
FIG. 4B is a rear elevational schematic of the fiber redirect system and associated fiber path shown in FIG. 4A.

Referring briefly to FIG. 4B, the redirect mechanisms 170 and 178 are also configured such that the width of the tow bands 112A and 112B (only one tow band 112A is shown in FIG. 4B for clarity) are centered about the axes of rotation 130, 132 and 134. Thus, for example, with a tow band 112A including eight individual fiber tows 106, the fiber tows 106 are symmetrically arranged relative to the yaw axis 132. Thus, for example, the two outermost fiber tows 106 are substantially equal distances from the yaw axis 132. Similarly, the two innermost fiber tows 106 are substantially equal distances from the yaw axis 132. Similar relationships are maintained with respect to the pitch and roll axes 130 and 132. Such a configuration defines what may be termed a collective fiber path for the multiple tow bands 112A and 112B wherein the plurality of fiber tows 106 (whether configured as a single tow band or as multiple tow bands) remains substantially symmetrical about the collective fiber path. Furthermore, the collective fiber path of the present invention substantially follows the centerlines or axes of rotation 130, 132 and 134 of the robotic wrist 114 (FIGS. 2A-2D) regardless of the orientation of the robotic wrist 114.

Referring back to FIG. 4A, as the robotic wrist 114 (FIGS. 2A-2D) rotates about the pitch axis 132, the segments of tow bands 112A and 112B extending between the pitch redirect mechanism 170 and yaw redirect mechanism 178 maintain substantially constant lengths, which lengths are generally defined by the distance along the yaw axis 132 extending between the pitch axis 130 and the roll axis 134.

Figure 4C:
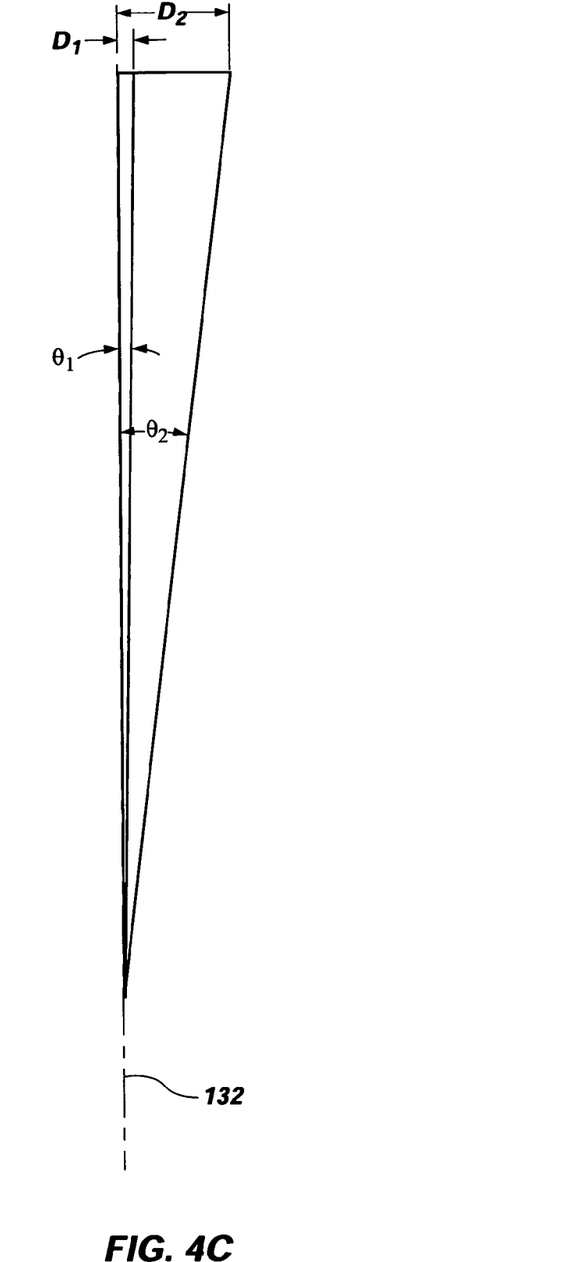
FIG. 4C is a geometric diagram showing the relationship of various fiber tows in accordance with an embodiment of the present invention.

Furthermore, referring back to FIG. 4B, as the robotic wrist 114 (FIGS. 2A-2D) rotates about the yaw axis 132, the pay out of an individual fiber tow 106 is determined largely by the lateral distance between a specific fiber tow 106 and the yaw axis 132. For example, a first fiber tow 106A is a first distance $D_1$ from the yaw axis 132 while a second fiber tow 106B is a second larger distance $D_2$ from the yaw axis 132. As shown in FIG. 4C, this relationship defines a first turning angle $\theta_1$ for the first fiber tow 106A and a second turning angle $\theta_2$ for the second fiber tow 106B. Thus, as will be appreciated by those of ordinary skill in the art, the amount of pay out experienced by a given fiber tow 106 due to rotation about the yaw axis 132 will be determined by the cosine of the turning angle of the fiber tow 106 (e.g., $\cos \theta_1$ or $\cos \theta_2$). Thus, by minimizing the distance of the fiber tows 106 from the yaw axis 132 or, in other words, by minimizing the allowed turning angle $\theta$, the pay out of the fiber tows 106 will also be minimized. In one embodiment, for example, the maximum allowed fiber tow turning angle $\theta$ may be approximately 9°. Of course such an arrangement is exemplary and other configurations are contemplated as being within the scope of the invention.

Similar relationships may be maintained between the yaw redirect mechanism 178 and the roll redirect mechanism 186 to minimize the pay out of individual fiber tows 106 associated with the turning angles of the fiber tows 106 extending therebetween.

It is noted that while the embodiments shown and described with respect to FIGS. 2A-2D and 3A-3C have employed two different tow bands 112A and 112B, the present invention may be applied to configurations utilizing three or more tow bands or even with a single tow band. Such embodiments would still include pitch and yaw redirect mechanisms 170 and 178 centered about the various intersections of axes of rotation (i.e., the intersection of the pitch and yaw axes 130 and 132 and the intersection of the yaw and roll axes 132 and 134, respectively) with the roll redirect mechanism 186 being centered about the roll axis 134 to effect a collective fiber path which passes through and is centered about the various axes 130, 132 and 134.

Referring back to FIG. 1 and FIG. 2A another feature of the present invention is shown. In controlling the robotic wrist 114, various transmission lines 220 are required to establish proper communication between, for example, sensors (not shown), actuators 136, 138 and 140 (as well as other actuators as will be appreciated by those of skill in the art) and the control system 150, as well as to provide power (e.g., electrical, hydraulic or pneumatic power) to such components. The configuration of the robotic wrist 114 allows the transmission lines 220 to be conveniently harnessed and maintained with many of the transmission lines 220 being conveyed through and at least partially concealed within the robotic wrist 114.

For example, an annulus 222 may be defined within the opening 174 of the yaw bearing 176, such as by the positioning of an inner sleeve 223 within the opening 174 and spaced apart from the inner wall thereof. The annulus 222 may serve as a transmission line path or raceway. Some transmission lines 220, such as those associated with the delivery system 115 and placement head 116, may extend from the annulus 222 above the robotic wrist 114 and then be partially wrapped, as a bundle 224 of transmission lines 220, about the roll bearing 184 or some other surface of the robotic wrist 114. Thus, as the robotic wrist 114 articulates through its range of motions, the transmission lines 220 are maintained in a controlled manner and kept from being whipped or slung around which, as mentioned above, may cause damage to the transmission lines 220 or pose a some other safety hazard.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A robotic wrist configured for articulation about at least three axes, the robotic wrist comprising:
    a first section;
    a second section coupled with the first section;
    a third section coupled with the second section, wherein each of the first section, the second section and the third section are configured to articulate about at least one axis of the at least three axes, and wherein at least one of the first section, the second section and the third section is configured to articulate about each of the at least three axes, at least two of the at least three axes being oriented such that they do not intersect each other;
    a material delivery mechanism associated with the third section;
    a first bearing coupled to the first section to accommodate relative rotation of at least one of the first section and the second section about at least one of the at least three axes, wherein an opening is formed in the first bearing; and
    a material redirect system configured to deliver an elongated material element to the material delivery mechanism along a material path having a portion that extends through the opening of the first bearing.

2. The robotic wrist of claim 1, wherein the material redirect system includes a first redirect mechanism located on a first side of the first bearing and a second redirect mechanism located on a second side of the first bearing such that the elongated material element is conveyed from the first redirect mechanism to the second redirect mechanism along the portion of the material path that extends through the opening of the first bearing.

3. The robotic wrist of claim 2, wherein the first redirect mechanism comprises at least a first roller assembly and wherein the second redirect mechanism comprises at least a second roller assembly.

4. The robotic wrist of claim 3, wherein each of the at least a first roller assembly and the at least a second roller assembly are located and configured to engage a plurality of fiber tows.

5. The robotic wrist of claim 2, wherein the material redirect system further includes a third redirect mechanism.

6. The robotic wrist of claim 5, wherein the second redirect mechanism and the third redirect mechanism are located and configured to deliver the elongated material element along another portion of the material path which extends substantially along one of the at least three axes.

7. The robotic wrist of claim 1, wherein the material redirect system is configured to deliver the elongated material element along the material path such that it passes through each of the at least three axes.

8. The robotic wrist of claim 1, wherein the at least three axes include a pitch axis, a yaw axis, and a roll axis.

9. The robotic wrist of claim 8, wherein the pitch axis and the yaw axis are defined to intersect one another.

10. The robotic wrist of claim 9, wherein the pitch axis and the roll axis are defined to extend in substantially perpendicular directions in separate, nonintersecting planes.

11. The robotic wrist of claim 8, wherein the yaw axis and the roll axis are defined to intersect one another.

12. The robotic wrist of claim 1, wherein the material delivery mechanism includes a material placement head coupled with the third section and configured to dispose at least a portion of the elongated material element on a specified surface of a work piece.

13. The robotic wrist of claim 1, further comprising a second bearing coupled between the second section and the third section to accommodate rotation of the third section relative to the second section about one of the at least three axes.

14. The robotic wrist of claim 13, wherein an opening is formed in the second bearing and wherein the material redirect system delivers the elongated material element along another portion of the material path that extends through the opening of the second bearing.

15. A method of conveying an elongated material element in association with a robotic wrist configured to articulate about at least three axes, wherein the robotic wrist includes a first section, a second section coupled with the first section and a third section coupled with the second section, wherein each of the first section, the second section and the third section are configured to articulate about at least one of the at least three axes, and wherein at least one of the first section, the second section and the third section is configured to articulate about each of the at least three axes, the method comprising:

orienting the at least three axes such that at least two axes of the at least three axes do not intersect one another;

conveying the elongated material element from a first location to a second location proximate the first section;

conveying the elongated material element from the second location to a third location substantially along at least one of the at least three axes;

conveying the elongated material element from the third location to a specified surface of a work piece.

16. The method according to claim 15, wherein conveying the elongated material element from the third location to a specified surface of a work piece further comprises conveying the elongated material element from the third location to a fourth location substantially along at least one other axis of the at least three axes.

17. The method according to claim 15, further comprising configuring the elongated material element as a plurality of collimated fiber tows.

18. The method according to claim 15, further comprising:

coupling a bearing to the first section of the robotic wrist to facilitate articulation of at least one of the first section and the second section about at least one axis of the at least three axes;

providing an opening through the bearing; and wherein conveying the elongated material element from the second location to the third location includes conveying the elongated material element through the opening in the bearing.

19. The method according to claim 18, wherein conveying the elongated material element through the opening in the bearing further includes positioning a material redirect mechanism on a first side of the bearing at the second location, and positioning a second redirect mechanism on a second, opposing side of the bearing at the third location and conveying the elongated material element from the first redirect mechanism to the second redirect mechanism.

20. The method according to claim 18, further comprising:

coupling another bearing to the third section of the robotic wrist to facilitate articulation of the third section about at least one other axis of the at least three axes;

providing an opening through the another bearing; and wherein conveying the elongated material element from the third location to a specified surface of a work piece includes conveying the elongated material element through the opening of the another bearing.

* * * * *